(12) United States Patent
Kuyper et al.

(10) Patent No.: US 11,466,497 B2
(45) Date of Patent: *Oct. 11, 2022

(54) DAMPENING HINGES AND TABLE ASSEMBLIES INCLUDING THE SAME

(71) Applicant: B/E Aerospace, Inc., Winston-Salem, NC (US)

(72) Inventors: John Kuyper, Winston Salem, NC (US); Deepak Chandra Kokkalla, Hyderabad (IN); Ian L. Frost, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,413

(22) Filed: Mar. 12, 2021

(65) Prior Publication Data

US 2021/0198930 A1 Jul. 1, 2021

Related U.S. Application Data

(62) Division of application No. 16/542,691, filed on Aug. 16, 2019, now Pat. No. 10,947,766.

(Continued)

(51) Int. Cl.
*E05F 3/20* (2006.01)
*A47B 5/04* (2006.01)

(52) U.S. Cl.
CPC .................. *E05F 3/20* (2013.01); *A47B 5/04* (2013.01); *E05Y 2201/21* (2013.01); *E05Y 2900/20* (2013.01)

(58) Field of Classification Search
CPC ... A47B 5/04; E05Y 2201/21; E05Y 2900/20; E05F 3/20; E05F 1/1058; E05F 1/1261
(Continued)

(56) References Cited

U.S. PATENT DOCUMENTS 2,605,155 A 7/1952 Lewis
2,709,818 A 6/1955 Freese
(Continued)

FOREIGN PATENT DOCUMENTS

DE 102007031175 B3 * 10/2008 ............. E05F 5/006
DE 202011103288 U1 * 11/2012 ............. E05F 5/006
(Continued)

OTHER PUBLICATIONS

Extended Search Report for European Application No. 19216018.1 dated Jul. 27, 2020.

*Primary Examiner* — Jose V Chen
(74) *Attorney, Agent, or Firm* — Suiter Swantz pc llo

(57) ABSTRACT

A dampened hinge construction for braking pivoting movement of one structure relative to another. The dampened hinge construction can be utilized in a folding table assembly in an aircraft passenger suite including a base panel and at least one folding panel pivotally attached to the base panel by multiple dampened hinges. Each dampened hinge includes a first assembly attachable to a first structure and a second assembly attachable to a second structure such that the first structure is pivotable relative to the second structure between a first condition and a second condition, such as a folded condition and a planar condition, and at least one damper that brakes pivoting movement of the first structure relative to the second structure as the first condition or second condition is approached.

13 Claims, 13 Drawing Sheets

Related U.S. Application Data

(60) Provisional application No. 62/844,517, filed on May 7, 2019, provisional application No. 62/844,497, filed on May 7, 2019.

(58) Field of Classification Search
USPC .................. 108/69, 73, 78, 44; 16/286, 289
See application file for complete search history.

(56) References Cited

U.S. PATENT DOCUMENTS

| | | | |
|---|---|---|---|
| 3,535,720 | A | 10/1970 | Woods |
| 7,743,465 | B2 * | 6/2010 | Lin ........................ F16F 9/12 |
| | | | 16/303 |
| 8,020,808 | B2 | 9/2011 | Collins et al. |
| 8,528,968 | B2 | 9/2013 | Moulton et al. |
| 8,991,010 | B2 * | 3/2015 | Brunnmayr ............ E05F 3/20 |
| | | | 16/319 |
| 9,114,879 | B2 | 8/2015 | Ligonniere et al. |
| 9,163,447 | B1 * | 10/2015 | Liang ..................... E05F 5/006 |
| 9,316,036 | B2 * | 4/2016 | Collene ................. E05F 1/1075 |
| 9,776,723 | B2 | 10/2017 | Gow et al. |
| 9,777,525 | B2 * | 10/2017 | Salice ..................... E05F 3/10 |
| 9,840,864 | B2 * | 12/2017 | Chen ..................... E05F 5/006 |
| 10,023,315 | B2 | 7/2018 | Kuyper et al. |
| 10,458,168 | B2 * | 10/2019 | Hammerer ............... E05D 3/16 |
| D865,374 | S | 11/2019 | Yang |
| 10,494,850 | B2 * | 12/2019 | Liang ..................... E05F 3/20 |
| 10,538,950 | B2 * | 1/2020 | Collene .................. E05F 5/10 |
| 10,947,766 | B2 * | 3/2021 | Kuyper .................. E05F 3/20 |
| 2005/0015927 | A1 * | 1/2005 | Kropf .................... E05D 3/142 |
| | | | 16/286 |
| 2006/0075934 | A1 | 4/2006 | Ram |
| 2011/0298349 | A1 * | 12/2011 | Sutterlutti ............. E05F 5/006 |
| | | | 16/352 |
| 2012/0325123 | A1 * | 12/2012 | Schoerkhuber .......... A47B 3/00 |
| | | | 108/134 |
| 2014/0331451 | A1 * | 11/2014 | Holzapfel ............... E05D 7/00 |
| | | | 16/286 |
| 2014/0345081 | A1 * | 11/2014 | Salice .................... E05F 5/006 |
| | | | 16/50 |
| 2014/0374551 | A1 | 12/2014 | Carter |
| 2016/0167555 | A1 * | 6/2016 | Allen .................... B60N 3/004 |
| | | | 108/134 |
| 2016/0376008 | A1 | 12/2016 | Kuyper et al. |

FOREIGN PATENT DOCUMENTS

| | | | | |
|---|---|---|---|---|
| WO | | 9956585 A1 | 11/1999 | |
| WO | WO-2008141829 A1 | * | 11/2008 | ............. B60N 3/001 |

* cited by examiner

DAMPENING HINGES AND TABLE ASSEMBLIES INCLUDING THE SAME

CROSS REFERENCE TO RELATED APPLICATIONS

This continuation application claims the benefit of priority of U.S. application Ser. No. 16/542,691, filed Aug. 16, 2019, entitled "Dampening Hinges and Table Assemblies Including the Same", and each of U.S. provisional patent application No. 62/844,517, filed May 7, 2019, entitled "Damped Table Hinge," and U.S. provisional patent application No. 62/844,497, filed May 7, 2019, entitled "Passenger Suite with Table Mechanism with Vertical, Translational and Rotational Adjustment," each of which is incorporated herein in its entirety by this reference.

BACKGROUND

Airline operators offer different passenger seating classes with varying levels of amenities for passenger comfort and use. Conventional economy seating classes typically include closely spaced rows of seats with little passenger living space and limited amenities. Business and first class seating classes typically include larger living spaces and a greater number of amenities.

One amenity found in most types of seating classes is a tray table, sometimes referred to as a meal table. In economy seating classes, tray tables may deploy from against the backside of a forward row of seats for use by an aft-positioned row of seats. In a first row of seats, tray tables may be attached to complex hinge mechanisms for vertical and rotational deployment from within an arm rest bay. Tray tables may be constructed with separate sections for compact packaging and stowage, wherein the tray table can be deployed and expanded to increase the tabletop size. Tabletop sections may be hinged together such that one table section folds against the other. While conventional hinge mechanisms provide the required motion for opening a folded table or folding a deployed table, such hinge mechanisms do not control their motion speed and so undue noise can occur as they are deployed and stowed.

Accordingly, improvements are needed in hinge constructions and mechanisms.

SUMMARY OF THE INVENTIVE ASPECTS

To achieve the foregoing and other advantages, the inventive aspects disclosed herein are directed to a folding table for use in a cabin environment such as an aircraft passenger suite. The folding table includes a base panel for attachment to a support structure, and a first folding panel pivotally attached to the base panel by multiple dampened hinges. Each dampened hinge includes a first assembly attached to the base panel, a second assembly attached to the first folding panel such that the first folding panel is pivotable relative to the base panel from a folded condition to a planar condition, and at least one damper that brakes pivoting movement of the first folding panel relative to the base panel as the folded condition or planar condition is approached.

In some embodiments, at least one slider is mounted to and movable relative to a housing of the first assembly or second assembly. At least one link is pivotally attached to the at least one slider and to a housing of the other of the first assembly or second assembly, the at least one link causing movement of the at least one slider upon pivoting movement of the first folding panel relative to the base panel. The at least one slider engages the at least one damper as the folded condition or planar condition is approached.

In some embodiments, at least one spring is between the at least one slider and a distal end of the housing of the first assembly or the housing second assembly. The at least one spring biases the dampened hinge from the folded condition or planar condition.

In some embodiments, a second spring biases the dampened hinge from the other of the folded condition or planar condition.

In some embodiments, each dampened hinge provides positive stopping when the unfolded condition is reached to provide a firm planar tabletop.

In some embodiments, a second folding panel is pivotally attached to the base panel through an intermediate hinge leaf providing a vertical offset between the base panel and the second folding panel.

In some embodiments, the first folding panel is pivotally attached by the multiple dampened hinges to a first end of the base panel, and the second folding panel is pivotally attached to a second end of the base panel opposite the first end.

In some embodiments, the second folding panel is pivotally attached to a second end of the base panel by at least a second hinge that accommodates a vertical offset of the second folding panel from the base panel when the first folding panel is in the folded condition between the base panel and second folding panel.

In some embodiments, the at least one damper brakes pivoting movement of the first folding panel relative to the base panel as the planar condition is approached, and a second damper brakes pivoting movement of the first folding panel relative to the base panel as the folded condition is approached.

In some embodiments, the at least one damper includes a fluid cylinder and a piston.

In another aspect, the inventive concepts disclosed herein are directed to a dampened hinge construction. The dampened hinge includes a first assembly attachable to a first structure, a second assembly attachable to a second structure to be pivotable relative to the first structure by the dampened hinge, the second assembly pivotable relative to the first assembly from a first condition to a second condition, and at least one damper that brakes pivoting movement of the second assembly relative to the first assembly as the first condition or second condition is approached.

In some embodiments, at least one slider is mounted to and movable relative to a housing of the first assembly or second assembly. At least one link is pivotally attached to the at least one slider and to a housing of the other of the first assembly or second assembly, the at least one link causing movement of the at least one slider upon pivoting movement of the first assembly relative to the second assembly, wherein the at least one slider engages the at least one damper as the first condition or second condition is approached.

In some embodiments, at least one spring is between the at least one slider and a distal end of the housing of the first assembly or the housing of the second assembly. The at least one spring biases the dampened hinge from the first condition or second condition.

In some embodiments, a second spring biases the dampened hinge from the other of the first condition or second condition.

In some embodiments, the at least one damper brakes pivoting movement of the second assembly relative to the first assembly as the second condition is approached, and the dampened hinge includes a second damper that brakes pivoting movement of the second assembly relative to the first assembly as the first condition is approached.

In some embodiments, the at least one damper includes a fluid cylinder and a piston.

In some embodiments, the first assembly comprises a first housing, a first slider mounted to and movable relative to the first housing, and a first link pivotally attached to the first housing. The second assembly includes a second housing, a second slider mounted to and movable relative to the second housing, and pivotally attached to the first link, and a second link pivotally connected to the second housing and pivotally connected to the first slider.

In some embodiments, the first assembly includes the at least one damper, and the at least one damper brakes pivoting movement of the second assembly relative to the first assembly as the second condition is approached by braking linear movement of the first slider relative to the first housing as the second condition is approached.

In some embodiments, the second assembly includes a second damper that brakes pivoting movement of the second assembly relative to the first assembly as the first condition is approached by braking linear movement of the second slider relative to the second housing as the first condition is approached.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Figure 1A:
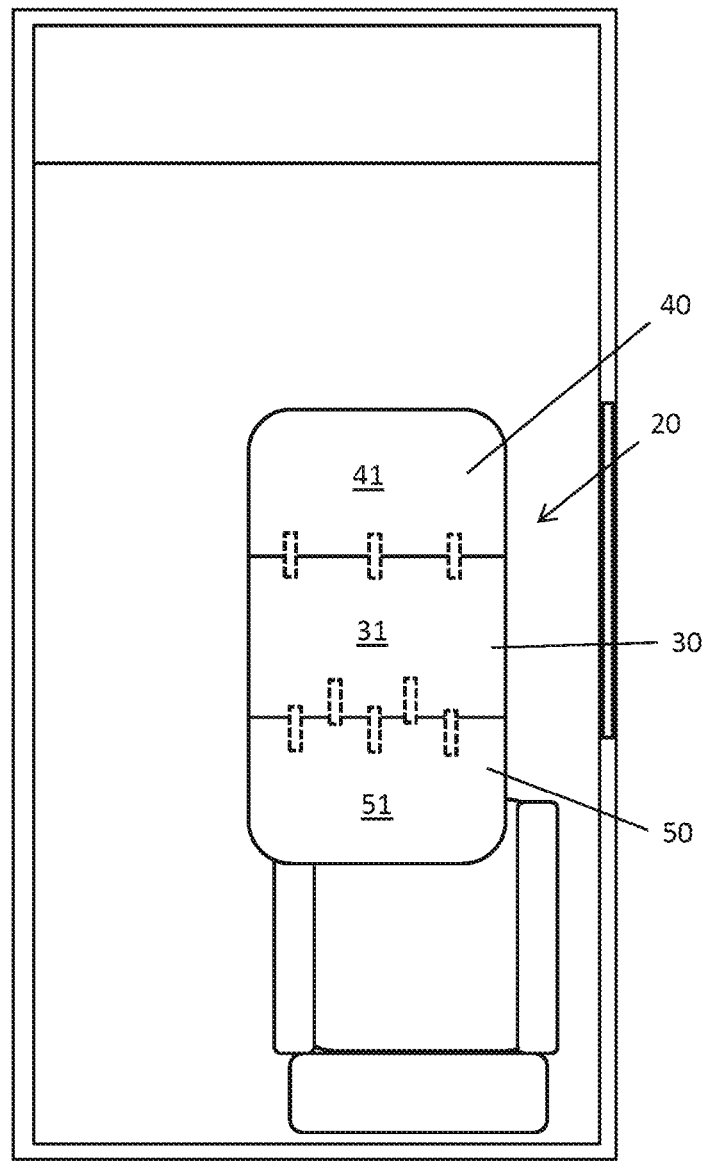
FIG. 1A is a top view of a trifold table, according to the present disclosure, shown in an unfolded deployed condition in a non-limiting example of an aircraft passenger suite.

FIG. 1A is a top view of a trifold table 20 positioned in an aircraft passenger suite. The trifold table 20 has a generally planar central base panel 30, mounted from below on a vertical support post 24 (FIG. 1B) or other supporting structure. The base panel 30 may be movable for translation and rotation around a vertical axis to permit placement and use of the trifold table 20 according to the preferences of occupants of the suite. The base panel 30, in an example implementation, is maintained near or at horizontal. In some implementations, the base panel 30 may be canted to compensate for flight angle of attack (e.g., two degrees to five degrees).

The trifold table 20 has a generally planar first folding panel, referenced as a close folding panel 40 for its close contact with the base panel 30 in the folded condition of the trifold table 20. A generally planar second folding panel is referenced as the spaced folding panel 50 for its vertical offset from the base panel 30 in the folded condition (FIG. 1C) of the trifold table 20 to accommodate the close folding panel 40 therebetween. In the unfolded and flat condition of the trifold table 20 as illustrated in FIG. 1A, the top side 31 of the base panel 30, the top side 41 of the close folding panel 40, and the top side 51 of the spaced folding panel 50, are essentially coplanar to serve together as a tabletop.

The base panel 30 has a first linear end 32 along which the close folding panel 40 is attached by first hinges 60, which are dampened hinges in a particular embodiment for which the below description pertain, to a proximal linear end 42 of the close folding panel 40. A second linear end 34 of the base panel 30, parallel to the first linear end 32 and spaced therefrom by the length of the base panel 30, is attached by second hinges 62 to a proximal linear end 52 of the spaced folding panel 50. The second hinges 62 accommodate the vertical offset of the spaced folding panel 50 from the base panel 30 in the folded condition of the trifold table 20. This permits the close folding panel 40 to be positioned between the base panel 30 and spaced folding panel 50 in the fully folded condition of the trifold table 20 (FIG. 1C), in which the base panel 30, close folding panel 40, and spaced folding panel 50 are stacked.

Figure 1B:
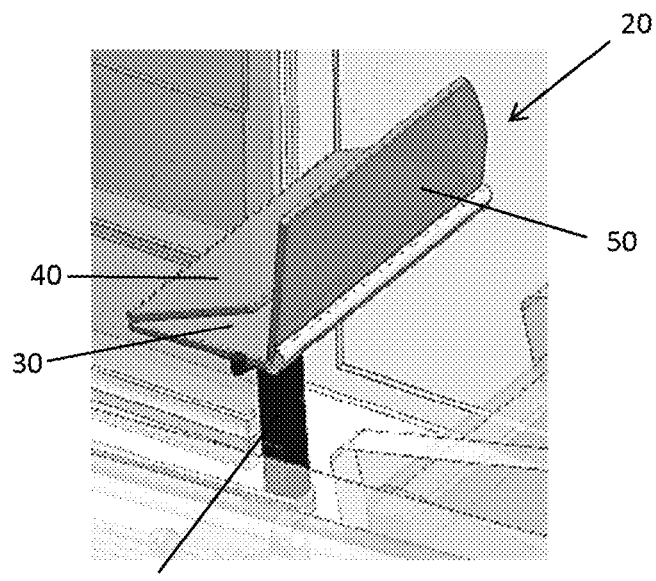
FIG. 1B is a perspective view of the trifold table of FIG. 1A, in a partially folded condition.
Figure 1C:
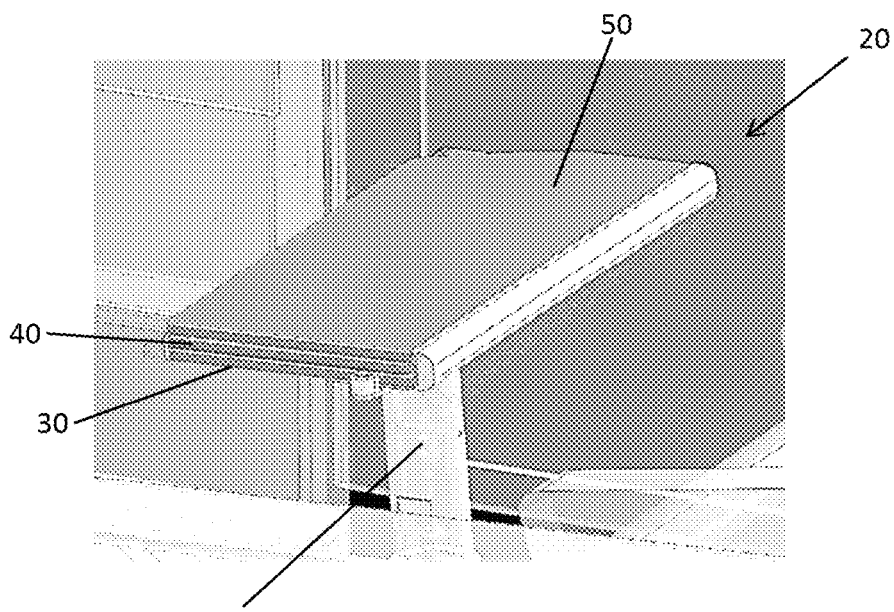
FIG. 1C is a perspective view of the trifold table of FIG. 1A, in a fully folded condition.

The close folding panel 40 and spaced folding panel 50 have respective distal ends 44 and 54 that opposite the proximal ends 42 and 52 thereof, and that define the deployed ends of the trifold table 20 in the unfolded condition. As the trifold table 20 transitions from the folded condition (FIG. 1C) through the partially folded condition (FIG. 1B) to the unfolded condition (FIG. 1A), the close folding panel 40 and spaced folding panel 50 pivot at their proximal ends 42 and 52 as their distal ends 44 and 54 travel to their destinations. The close folding panel 40 should transition ahead of the spaced folding panel 50 when folding the trifold table 20, keeping the close folding panel 40 closer to the base panel 30 than the spaced folding panel 50, to permit a stacked stable folded condition (FIG. 1C).

The base panel 30, the close folding panel 40, and the spaced folding panel 50 have generally the same widths W, defining the general width of the table. They have generally the same lengths L as well, the sum of which approximately defines the length of the trifold table 20 in the unfolded condition. That they have the same lengths and widths also provides a neat appearing assembly in the stacked folded condition in which exposed ends and sides align without considerable overhangs.

The base panel 30 is rectangular, having linear sides 36 perpendicular to the first and second linear ends 32 and 34. The close folding panel 40 and the spaced folding panel 50 have respective linear first sides 46 and 56 defining, together with a linear side 36 of the base panel 30, a first linear side 26 of the trifold table 20 in the unfolded condition. The respective second sides 48 and 58 of the close folding panel 40 and spaced folding panel 50, opposite the first sides 46 and 56, are arcuate near the distal ends 44 and 54, such that the corners of the second side 28 of the deployed trifold table 20 are tapered, rounded, or beveled for safety and aesthetic purposes.

The first hinges 60 by which the close folding panel 40 is attached to the base panel 30 permit them to stack or overlap as they are folded together. The first hinges 60 furthermore permit the close folding panel 40 and base panel 30 to align and contact at their attached linear ends 42 and 32 in the unfolded planar condition. The first hinges 60 may be biased toward relative positions of the base panel 30 and close folding panel 40 that are intermediate positions between the fully unfolded position (FIG. 1A) and folded position (FIG. 1C). This slows hinging movement as the limits of their motion range, the planar and stacked conditions (FIGS. 1A, 1C), are approached. This also provides lift assistance when a user pivotally raises the close folding panel 40 from either limit of its motion range, the planar and stacked conditions (FIGS. 1A, 1C), which are horizontal and relatively low positions, and acts as a counter balance and reduces the perceived weight of the close folding panel 40. Thus, the perceived weight of the folding panel 40 is reduced as with a counter balance.

Figure 1D:
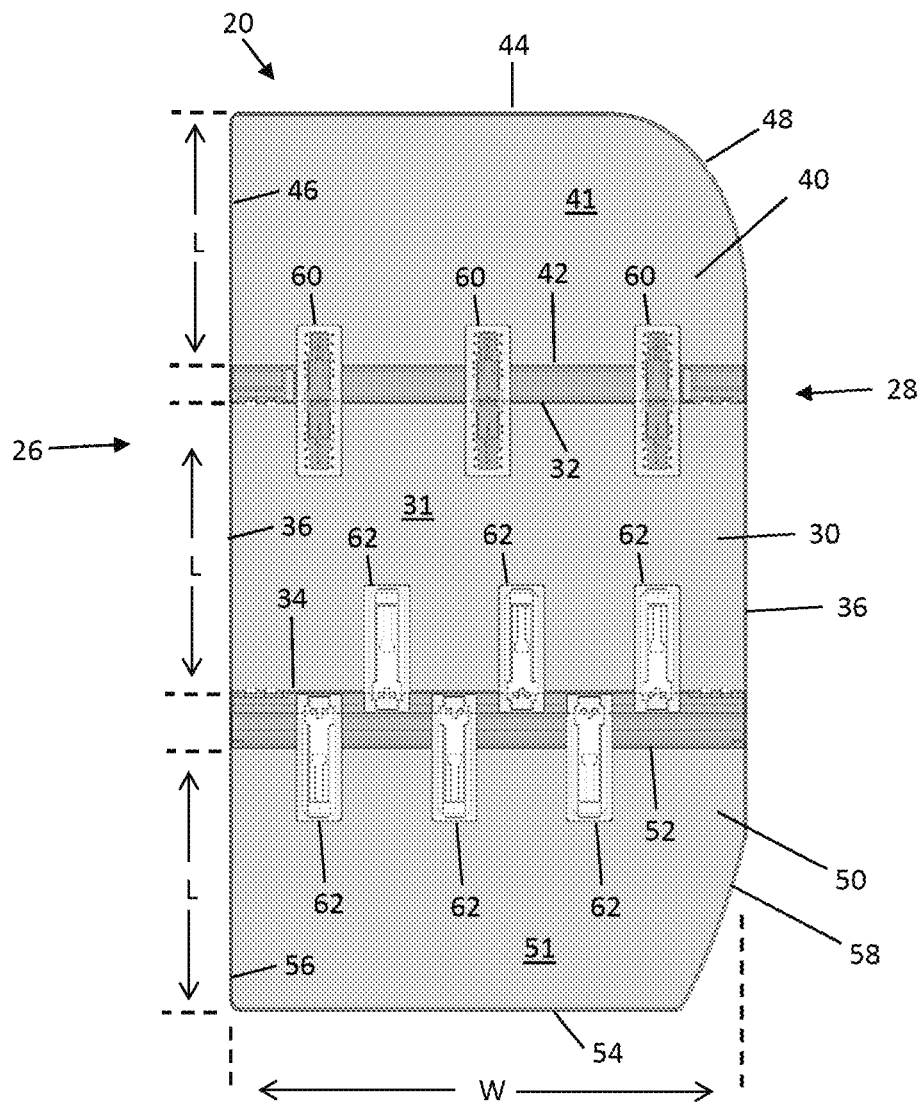
FIG. 1D is an enlarged top view of the trifold table of FIG. 1A.

The hinges 60 may also or furthermore be motion-dampened at the limits of their motion range, the planar and stacked conditions (FIGS. 1A, 1C). This provides speed dependent braking of the pivoting movement of the close folding panel 40 at it approaches the limits of its motion range at the planar and stacked conditions, reducing clatter noise as the table is folded and unfolded. Dampening may be applied by the hinges 60, for example as described below with reference to the dampened hinge 100, against folding toward the fully folded condition (FIG. 1C) when the angle between the top side 31 of the base panel 30 and the top side 41 of the close folding panel 40 is in a range of approximately 30 degrees (30°) to 0 degrees (0°) such that dampening against further folding is applied at 30 degrees (30°) and increases as the fully folded condition is further approached. Dampening may also applied by against unfolding toward the planar condition (FIG. 1D) when the angle between the top side 31 and the top side 41 is in a range of approximately 150 degrees (150°) to 180 degrees (180°) such that dampening against further unfolding is applied at 150 degrees (150°) and increases as the planar condition is further approached.

The second hinges 62 may provide similar beneficial functions, including biasing and motion dampening, at the limits of the motion range of the spaced folding panel 50. The first hinges 60 and second hinges 62 provide positive stopping when the planar unfolded condition is reached to provide a firm planar tabletop. In any position, the close folding panel 40 and the spaced folding panel 50 are entirely supported by the base panel 30. Particularly, the close folding panel 40 and the spaced folding panel 50 are supported by the base panel 30 and hinges in cantilever fashion.

Figure 2:
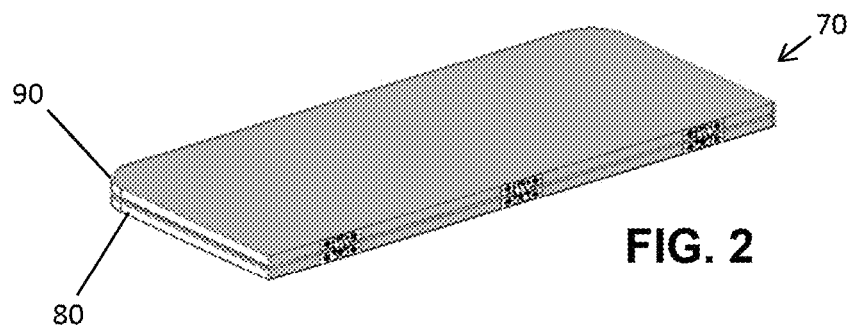
FIG. 2 is a perspective view of a bifold table having dampened hinges according to the present disclosure, in a folded condition.
Figure 3:
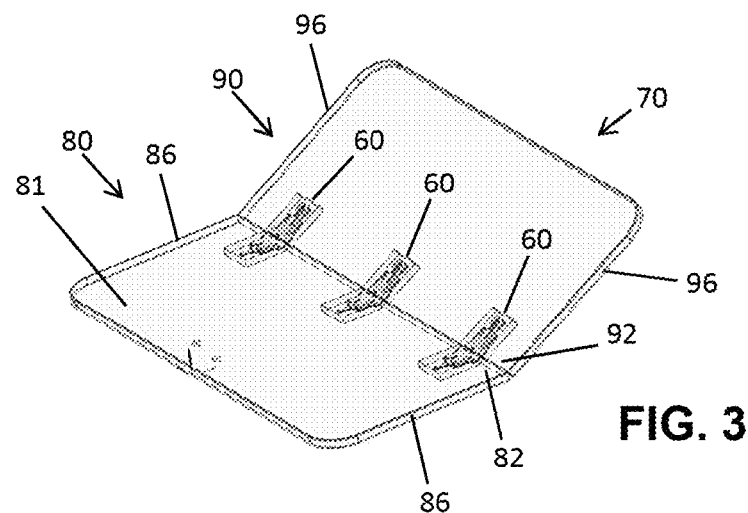
FIG. 3 is a perspective view of the bifold table of FIG. 2, in a partially unfolded condition.
Figure 4:
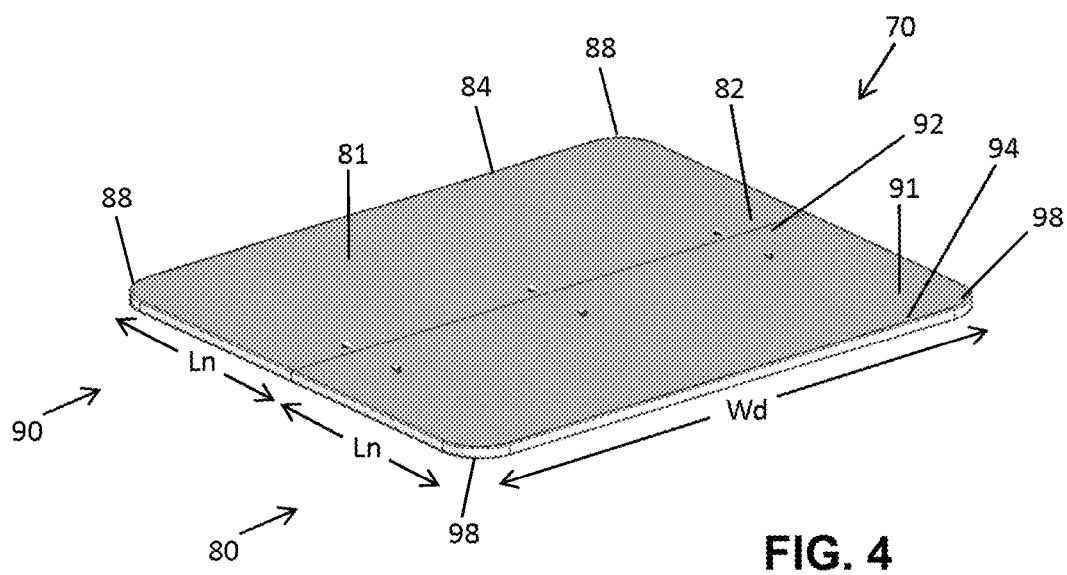
FIG. 4 is a perspective view of the bifold table of FIG. 3, in an unfolded condition.

FIG. 2 illustrates a bifold table 70, according to the present disclosure, having two panels in a folded condition. A first of the two generally planar panels, referenced as a base panel 80, is shown in a fixed horizontal position in FIGS. 2-4, representing for example that the base panel 80 may be mounted from below on a vertical post or other supporting structure. The base panel 80 may be movable for horizontal and vertical translation and rotation around a vertical axis to permit placement and use of the bifold table 70 according to user preferences.

A generally planar second panel, referenced as a folding panel 90 for its folding movement relative to the base panel 80, pivots to close contact with the base panel 80 in the folded condition of the bifold table 70 (FIG. 2). In the unfolded and flat condition of the bifold table 70 as illustrated in FIG. 4, the top side 81 of the base panel 80, and the top side 91 of the folding panel 90, are essentially coplanar to serve together as a tabletop.

The base panel 80 has a first linear end 82 along which the folding panel 90 is attached by hinges 60, which are dampened hinges in a particular embodiment for which the below descriptions pertain, to a first linear end 92 of the folding panel 90. The base panel 80 and folding panel 90 have respective second ends 84 and 94 opposite the first ends 82 and 92 thereof. The second ends 84 and 94 define the deployed ends of the bifold table 70 in the unfolded condition. As the bifold table 70 transitions from the folded condition (FIG. 2) through the partially folded condition (FIG. 3) to the unfolded condition (FIG. 4), the folding panel 90 pivots at its first end 92 as its second end 94 travels to its destination extending horizontally and oppositely the second end 84 of the base panel 80.

The base panel 80 and folding panel 90 have generally the same widths Wd, defining the general width of the bifold table 70. They have generally the same lengths Ln as well, the sum of which defines the length of the bifold table 70 in the unfolded condition. That they have the same widths and lengths also provides a neat appearing assembly in the stacked folded condition in which exposed ends and sides align without considerable overhangs.

The base panel 80 and folding panel 90 are generally rectangular, having linear respective sides 86 and 96 perpendicular to the first linear ends 82 and 92 and second linear ends 84 and 94. The outside corners 88 of the base panel 80 and outside corners 98 of the folding panel 90 are rounded and or beveled for safety and aesthetic purposes. The bifold table 70 in the unfolded condition has a rectangular overhead form or footprint, which may be square depending on the particular dimensions of the base panel 80 and folding panel 90 in any particular implementation.

The hinges 60 by which the folding panel is attached to the base panel 80 permit them to stack or overlap as they are folded together. The hinges furthermore permit the folding panel 90 and base panel 80 to align and contact at their attached linear first ends 82 and 92 in the unfolded planar condition. The hinges 60 may be biased toward relative positions of the base panel 80 and folding panel 90 that are intermediate positions between the fully unfolded condition (FIG. 4) and folded condition (FIG. 2). This slows hinging movement as the limits of their relative motion range, the planar and stacked conditions (FIGS. 4, 2), are approached. This also provides lift assistance when a user pivotally raises the folding panel 90 from either limit of its motion range, the planar and stacked conditions (FIGS. 4, 2), which are horizontal and relatively low positions. Thus, the perceived weight of the folding panel 90 is reduced as with a counter balance.

The hinges 60 may also or furthermore be motion-dampened at the limits of their motion range, the planar and stacked conditions (FIGS. 4, 2). This provides speed-dependent braking of the pivoting movement of the folding panel 90 at it approaches the limits of its motion range at the planar and stacked conditions, reducing clatter noise as the table is folded and unfolded. For example, dampening may be applied by the hinges 60, for example as described below with reference to the dampened hinge 100, against folding toward the fully folded condition (FIG. 1C) when the angle between the top side 81 of the base panel 80 and the top side 91 of the folding panel 90 is in a range of approximately 30 degrees (30°) to 0 degrees (0°) such that dampening against further folding is applied at 30 degrees (30°) and increases as the fully folded condition is further approached. Dampening may also be applied against unfolding toward the planar condition (FIG. 1D) when the angle between the top side 81 and the top side 91 is in a range of approximately 150 degrees (150°) to 180 degrees (180°) such that dampening against further unfolding is applied at 150 degrees (150°) and increases as the planar condition is further approached.

The hinges 60 provide positive stopping when the planar unfolded condition is reached to provide a firm planar tabletop. In any position, the folding panel 90 is entirely supported by the base panel 80. Particularly, the folding panel 90 is supported by the base panel 30 and hinges in cantilever fashion.

Figure 9:
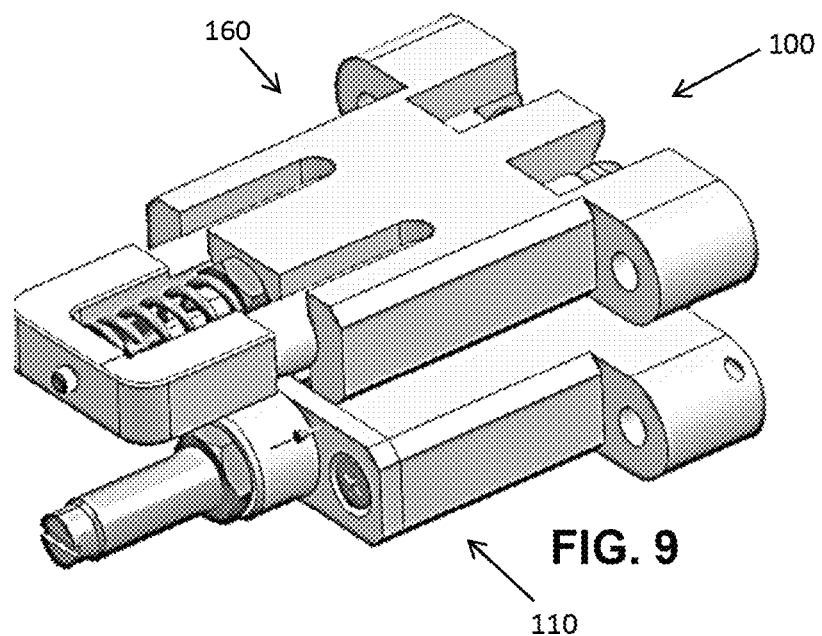
FIG. 9 is a perspective view of the dampened hinge of FIG. 5, in a fully folded condition.
Figure 10:
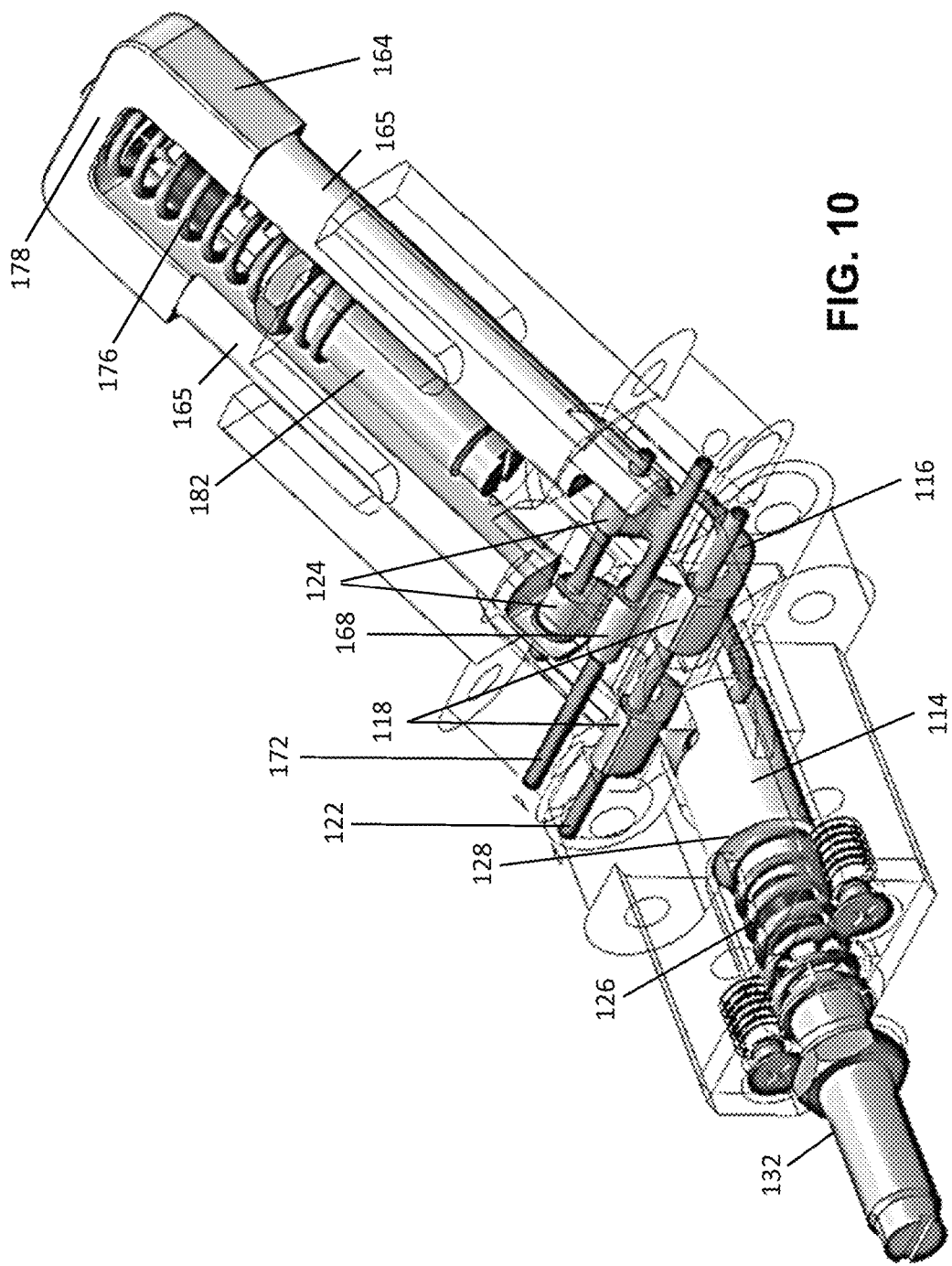
FIG. 10 is a perspective view of the dampened hinge of FIG. 5, in the intermediate folded condition of FIG. 6, shown with housings thereof as transparent to illustrate internal components.
Figure 11:
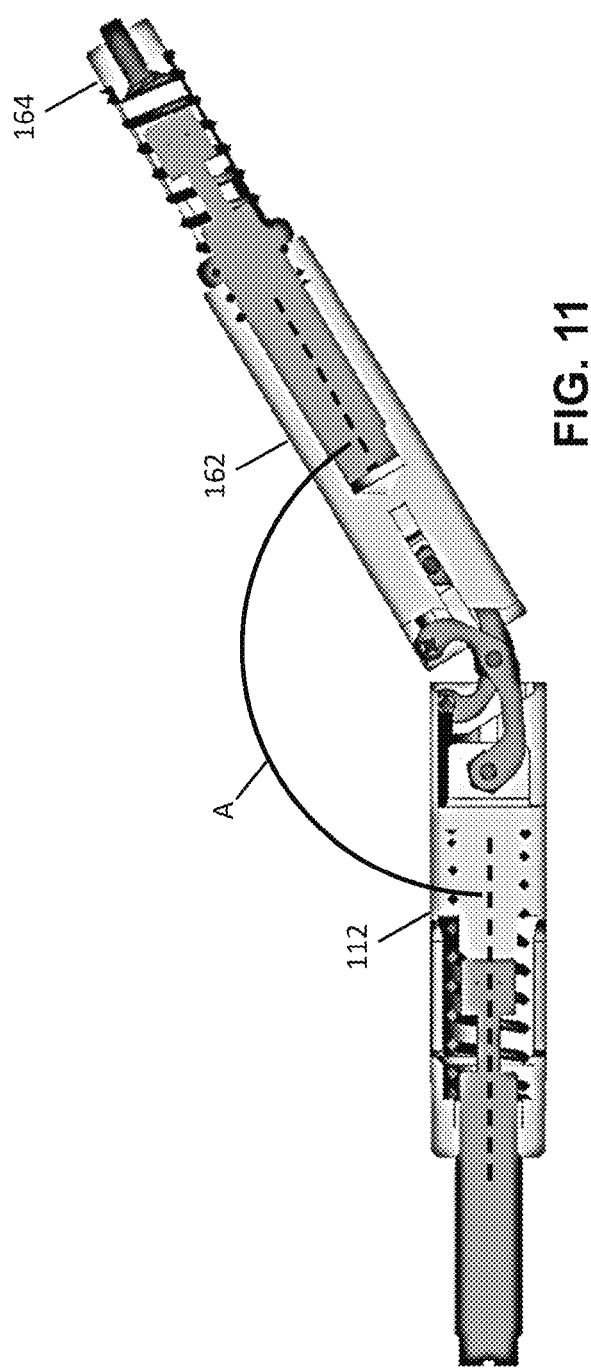
FIG. 11 is a cross-sectioned view, taken along a mid plane A-A as shown in FIG. 5, of the dampened hinge in a first dampened almost planar condition.
Figure 12:
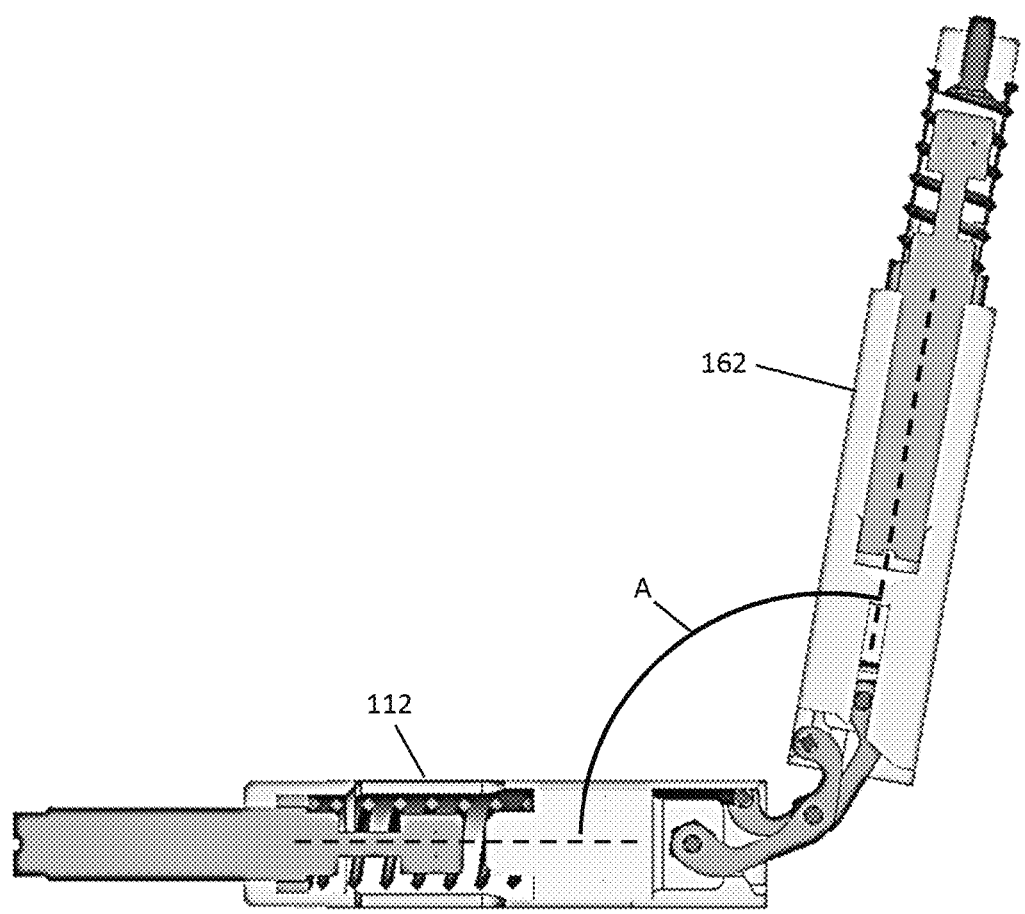
FIG. 12 is a cross-sectioned view, taken along the mid plane A-A as shown in FIG. 5, of the dampened hinge in an undampened partially folded condition.

A dampened hinge 100, such as hinge 60, is shown in FIGS. 5-13 in various conditions between unfolded (FIG. 5), and fully folded (FIG. 9). The dampened hinge 100 can be implemented in both the trifold table 20 of FIGS. 1A-1C and in the bifold table 70 of FIGS. 2-4 to serve as the hinges 60. Referring to parts of the dampened hinge 100 and FIG. 5, a first assembly 110 and a second assembly 160 are foldable relative to each other as represented in FIGS. 5-9, which depict the dampened hinge 100 in conditions transitioning progressively from an unfolded planar condition (FIG. 5), to a fully folded condition (FIG. 9).

The first assembly 110 includes a first housing 112 (FIG. 5) and a first slider 114 (FIG. 10) mounted within and linearly movable relative to the first housing. The second assembly 160 includes a second housing 162 (FIG. 5) and a second slider 164 (FIGS. 5, 10) mounted to and linearly movable relative to the second housing. The first housing 112 and second housing 162 are interconnected and foldable relative to each other by way of laterally spaced first links 116 and a second link 166. The first links 116 and second link 166 facilitated a multi-axis folding function of the dampened hinge 100 that permits the first and second housings 112 and 162 to align and contact at their respective proximal ends 120 and 170 in the unfolded planar condition (FIG. 1), and to stack or overlap in the fully folded condition (FIG. 9). Such a function is useful, for example, in the trifold table 20 as shown in FIGS. 1A-1C, and in the bifold table 70 as shown in FIGS. 2-4.

The first links 116 (FIG. 13) have proximal ends 118 pivotally attached to the proximal end 120 of the first housing 112 by a first laterally extending axle 122 (FIG. 10) that is fixed to and carried by the proximal end 120. The first links 116 have distal ends 124 extending outward from the proximal end 120 to engage and actuate the second slider 164. In particular, the distal ends 124 of the first links 116 are pivotally attached to the second slider 164 to cause linear movement thereof along the longitudinal axis 163 of the second housing 162 as the dampened hinge 100 transitions among conditions (FIGS. 5-9).

Similarly, the second link 166 has a proximal end 168 (FIG. 13) pivotally attached to the proximal end 170 of the second housing 162 by a second laterally extending axle 172 (FIG. 10) that is fixed at and carried by the proximal end 170. The second link 166 has a distal end 174 extending outward from the proximal end 170 to engage and actuate the first slider 114. In particular, the distal end 174 of the second link 166 is pivotally attached to the first slider 114 to cause linear movement thereof along the longitudinal axis 113 the first housing 112 as the dampened hinge transitions among conditions (FIGS. 5-9).

Figure 5:
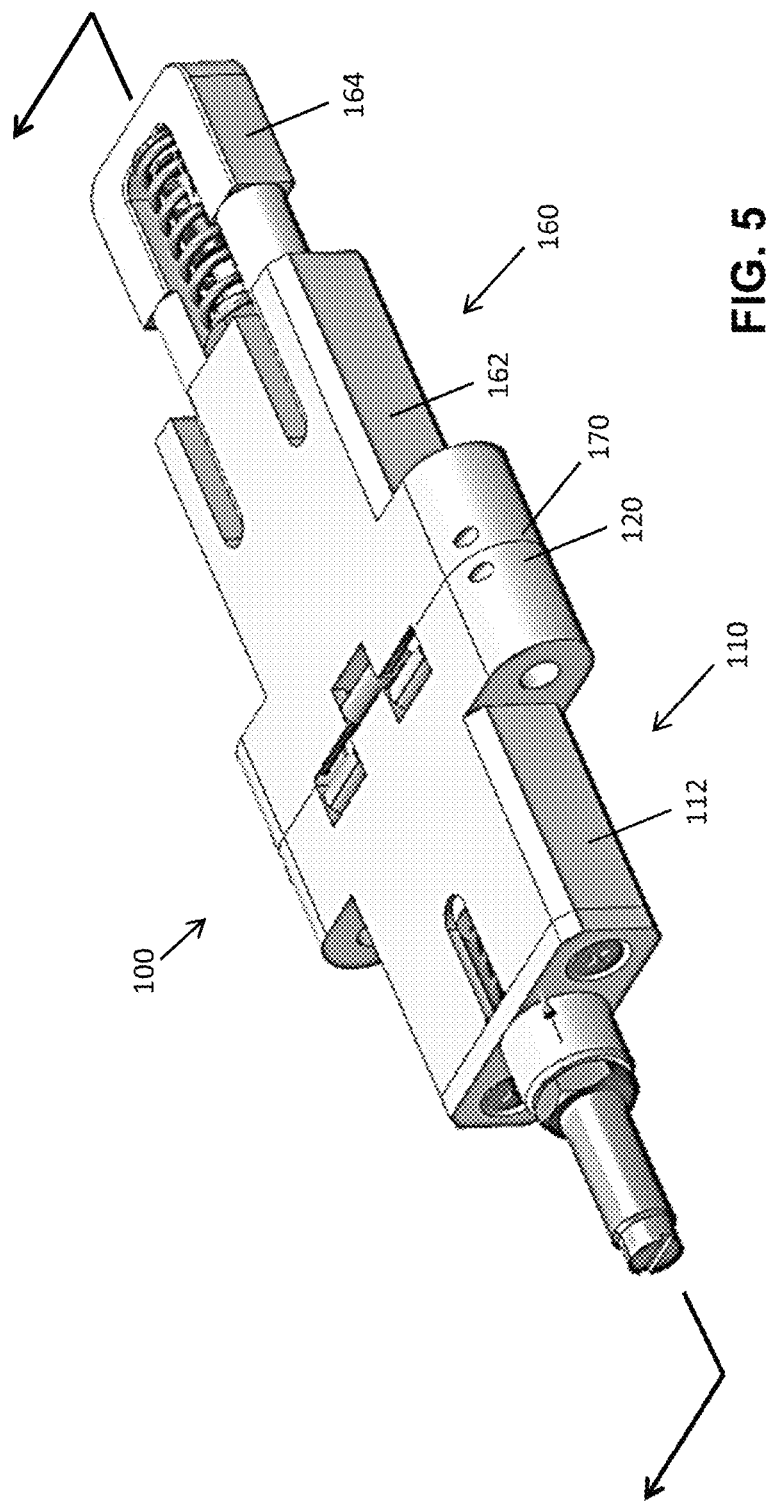
FIG. 5 is a perspective view of a dampened hinge, according to the present disclosure; in an unfolded planar condition.
Figure 6:
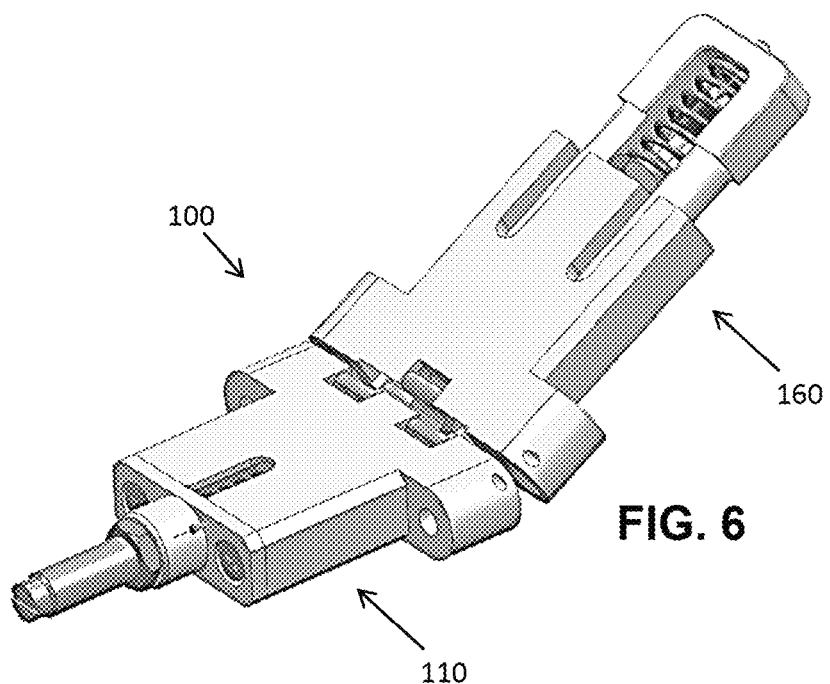
FIG. 6 is a perspective view of the dampened hinge of FIG. 5, in a folded condition intermediate the planar condition and a right-angle condition.
Figure 7:
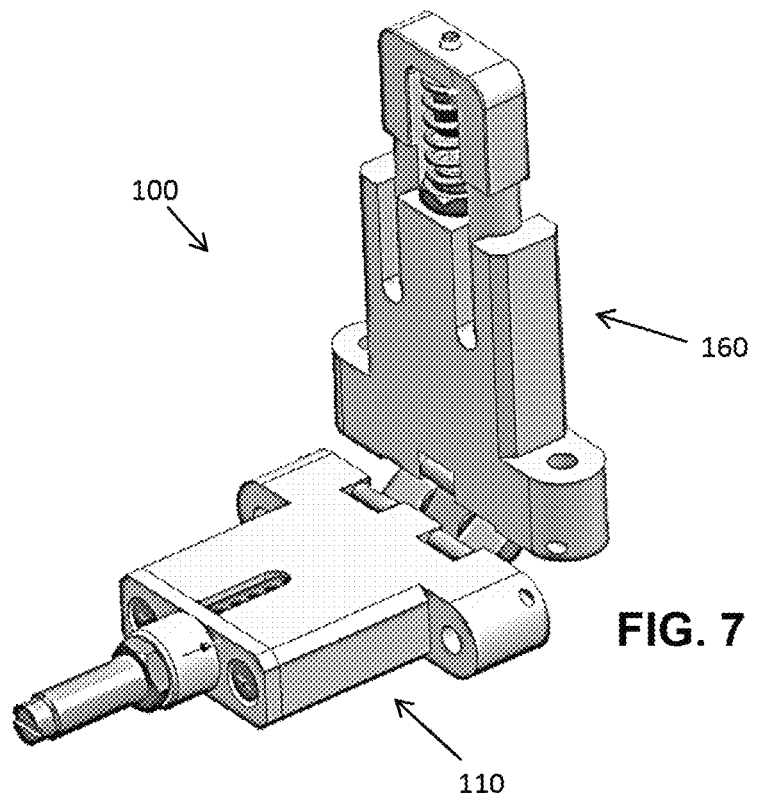
FIG. 7 is a perspective view of the dampened hinge of FIG. 5, in a folded right-angle condition.
Figure 8:
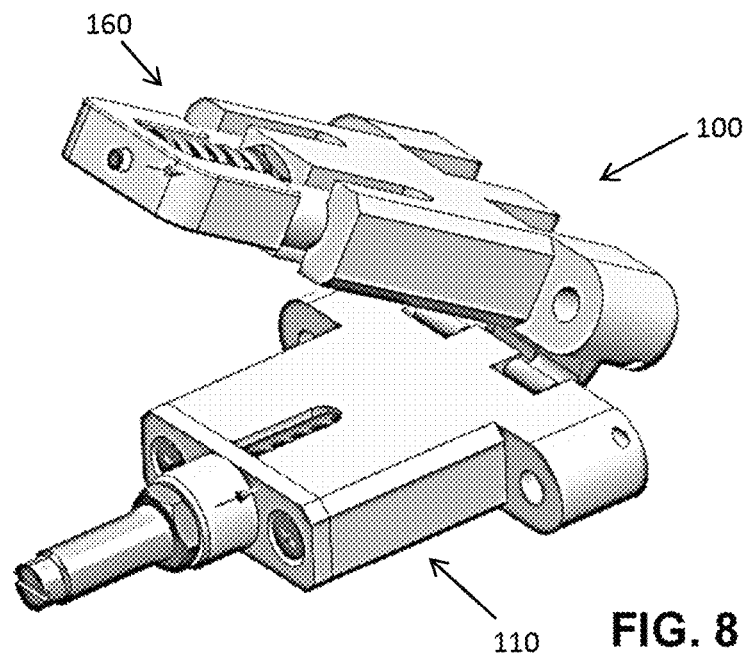
FIG. 8 is a perspective view of the dampened hinge of FIG. 5, in a folded condition intermediate the right angle condition and a fully folded condition.

The dampened hinge 100 is biased from the unfolded planar condition (FIG. 5) to more unfolded conditions (FIGS. 6-7) by a first spring 126 captured between an annular shoulder 128 of the first slider 114 and a distal end plate 130 of the first housing 112. As the second housing 162 is moved into alignment with the first housing 112 from folded conditions (FIGS. 7 to 6) toward the condition of FIG. 5, the second link 166 moves the first slider 114 toward the end plate 130 of the first housing. This compresses the first spring 126, which reaches its most compressed condition at the unfolded planar condition (FIG. 5).

The dampened hinge 100 is biased from the fully folded condition (FIG. 9) to less folded conditions (FIGS. 8 to 7) by a second spring 176 captured between a distal end plate 178 of the second slider 164 and a distal abutment 180 of the second housing 162. As the second housing 162 is moved toward the fully folded condition (FIG. 9) to stack or overlap with the first housing 112, the first links 122 move the second slider 164 toward the proximal end 170 of the second housing 162. This compresses the second spring 176, which reaches its most compressed condition at the fully folded condition (FIG. 9).

Thus, the dampened hinge 100 is biased from the unfolded planar condition (FIG. 5) by the first spring 126 carried by the first housing 110 and is biased from the fully folded condition (FIG. 9) by the second spring 176 carried by the second housing 162. The dampened hinge 100 is therefore spring biased from the limits of its motion range, the planar and stacked conditions (FIGS. 5 and 9), by the first and second springs 126 and 176 respectively. This slows hinging movement as the limits the motion range are approached. This also provides lift assistance for example when a user pivotally raises a panel from a horizontal position in a folding panel assembly in which the dampened hinge is used, for example as in the above described trifold table 20 and bifold table 70.

The dampened hinge 100 is furthermore motion-dampened at the limits of its configuration or motion range, the planar and stacked conditions (FIGS. 5 and 9), by first and second dampers respectively. A first damper 132 carried by the first assembly 110 has a fluid cylinder fixed to the distal end plate 130 and extending outward from the distal end of the first housing 112. A piston surrounded by the first spring 126 extends from the cylinder into the first housing 112 toward a head of the first slider 114 surrounded by the annular shoulder 128 and first spring 126. As the second housing 162 is moved into alignment with the first housing 112 from folded conditions toward the condition of FIG. 5, and the second link 166 pushes the first slider 114 toward the distal end plate 130, the head of the first slider 114 approaches and ultimately abuts a bumper or cap at the terminal end of the piston 136 opposite the cylinder. This engages the first slider 114 and first damper 132, and with continued movement, the first slider 114 compresses the first damper 132 by pressing the piston into the cylinder, for example thereby forcing fluid through a small orifice with resistant force being speed dependent. As the dampened hinge approaches the unfolded planar condition (FIG. 5), motion is dampened and thus any rapid unfolding of the dampened hinge is resisted. Once engaged, the damper 132 resists further compression with a force dependent upon the speed at which the compression occurs, thus providing a speed-dependent dampening. Higher speed of compressing movement results in higher resistance and dampening.

Figure 13:
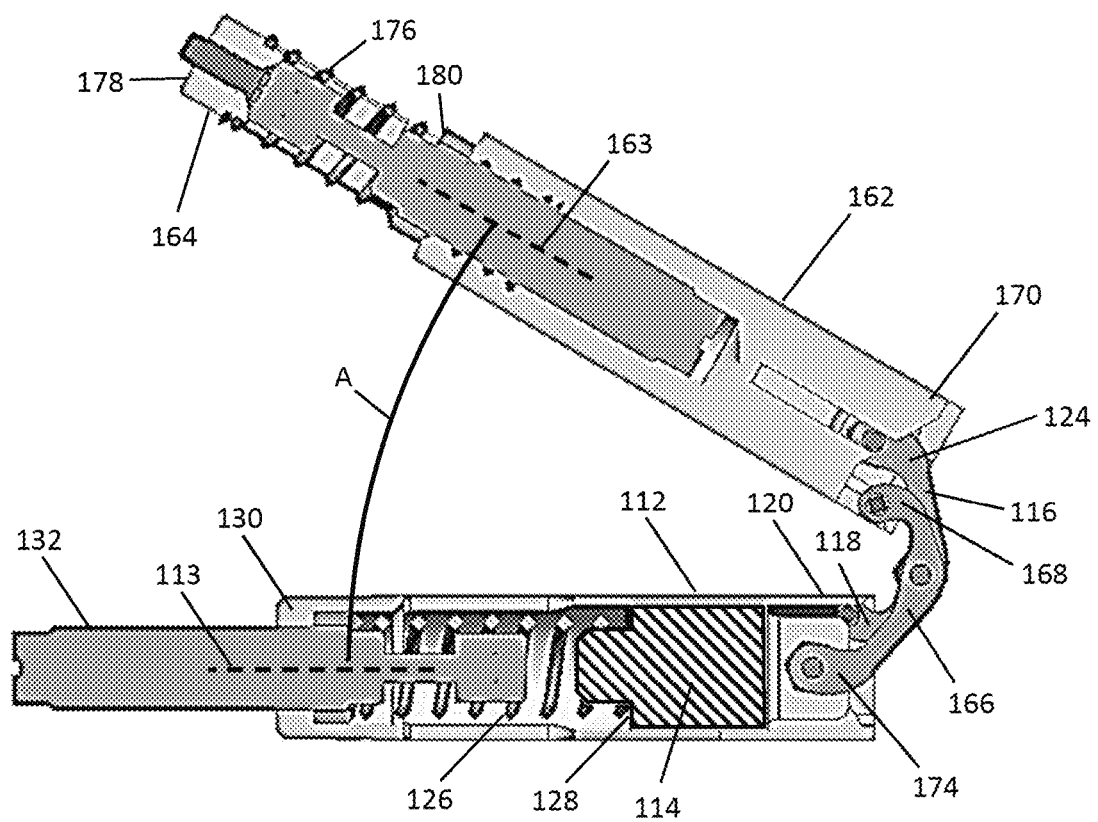
FIG. 13 is a cross-sectioned view, taken along the mid plane A-A as shown in FIG. 5, of the dampened hinge in a second dampened almost fully folded condition.

In various examples of the dampened hinge 100, the angle of fold of the dampened hinge 100 at which the first slider 114 engages the first damper 132, which defines the onset of dampening when the unfolded planar condition is approached, can vary. An angle A is defined between the longitudinal axis 113 of the first housing 112 and the longitudinal axis 163 of the second housing 162 as shown in FIG. 13 such that the fully folded condition of FIG. 9 corresponds to angle A at zero degrees (0°), and the planar unfolded condition of FIG. 5 corresponds to angle A at one hundred and eighty degrees (180°). In use as the hinge 60 in the above described trifold table 20 and bifold table 70, the angle A at which the first slider 114 engages the first damper 132 is thirty degrees (30°). In that example, dampening is applied by the first damper 132 against folding toward the planar condition when the angle A is in a range of approximately 150 degrees (150°) to 180 degrees (180°) such that dampening against further unfolding is applied at 150 degrees (150°) and increases as the planar condition is further approached.

A second damper 182 carried by the second assembly 160 has a fluid cylinder within and fixed to the second housing 162 and a piston surrounded by the second spring 176 and extending outward from the cylinder toward the distal end plate 178 of the second slider 164. As the second housing 162 is moved toward the fully folded condition (FIG. 9), and the first link pulls the second slider 164 toward the proximal end of the second assembly, a cap surrounded by the second spring 176 and extending inward from the distal end plate 178 of the second slider 164 approaches and ultimately abuts a bumper or cap at the terminal end of the piston opposite the cylinder. This compresses the second damper 182 by pressing the piston into the cylinder, for example thereby forcing fluid through a small orifice with resistant force being speed dependent. As the dampened hinge approaches the fully folded condition (FIG. 9), motion is dampened and thus any rapid folding of the dampened hinge is resisted.

The angle of fold of the dampened hinge 100 at which the second slider 164 engages the second damper 182, which defines the onset of dampening when the fully folded condition is approached, can also vary. In use as the hinge 70 in the above described trifold table 20 and bifold table 70, the angle A at which the second slider 164 engages the second damper 182 is thirty degrees (30°). In that example, dampening is applied by the second damper 132 against folding toward the fully folded condition when the angle A is in a range between approximately 30 degrees (30°) to 0 degrees (0°) such that dampening against further folding is applied at 30 degrees (30°) and increases as the fully folded condition is further approached. Once engaged, the damper 182 resists further compression with a force dependent upon the speed at which the compression occurs, thus providing a speed-dependent dampening. Higher speed of compressing movement results in higher resistance and dampening.

The two first links 116 of the dampened hinge 100 are laterally spaced, and the second link 166 is positioned generally between the two first links 116. This arrangement balances or coordinates the forces of the first links 116 and second link 166, which are opposed in at least some conditions of the dampened hinge and facilitates smooth folding action of the dampened hinged without unwanted off-axis wobbling. The second slider 164 has two rails 165 (FIG. 10) that are linearly movable relative to the second housing 162. The distal ends 124 of the first links 116 are pivotally attached to proximal ends of the two rails 165 of the second slider 164, thereby imparting movement to both rails as the dampened hinge 100 transitions among conditions (FIGS. 5-9).

The dampened hinge 100 provides positive stopping when the planar unfolded condition (FIG. 5) is reached. This provides a firm planar tabletop in a folding panel assembly in which the dampened hinge is used, for example as in the above described trifold table 20 and bifold table 70. For such use in the trifold table 20, the first assembly 110, for example, can be mounted into the first linear end 32 of the central base panel 30 and the second assembly can be mounted into the proximal linear end 42 of the close folding panel 40. For use in the bifold table 70, the first assembly 110, for example, can be mounted into the first linear end 82 of the base panel 80 and the second assembly 160 can be mounted into the first linear end 92 of the folding panel 90. FIGS. 5-12 depict the first assembly as disposed generally horizontally in keeping with the expected horizontal dispositions of the central base panel 30 of the trifold table 20 and the base panel 80 of the bifold table 70. The dampened hinge can be used in other installations and arrangements. In other arrangements, the first assembly 110 can be mounted to or in a first structure, and the second assembly can be mounted to or in a second structure, to facilitated dampened pivoting of the first and second structure. For example, the dampened hinge can be used with doors and lids for closure of luggage storage compartments and other containers.

Figure 14A:
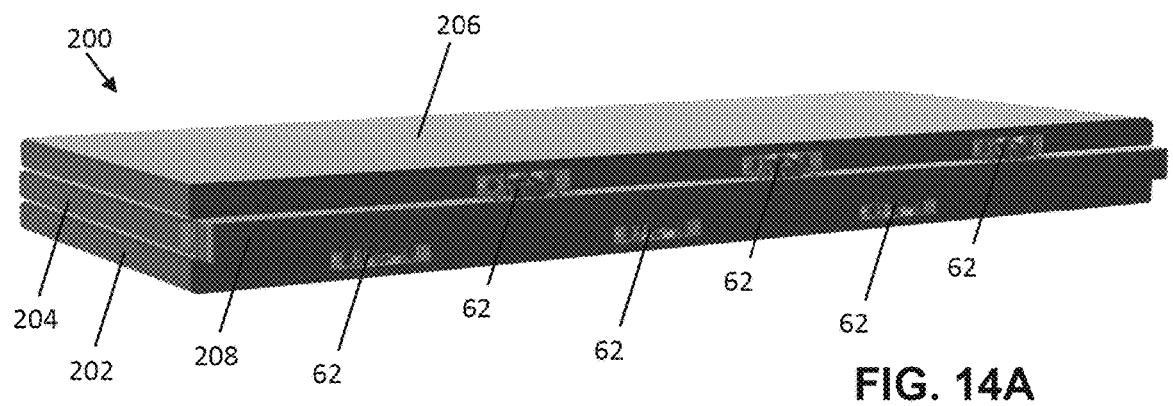
FIGS. 14A and 14B are perspective views of a trifold table, according to the present disclosure, shown in a fully folded condition.
Figure 14B:
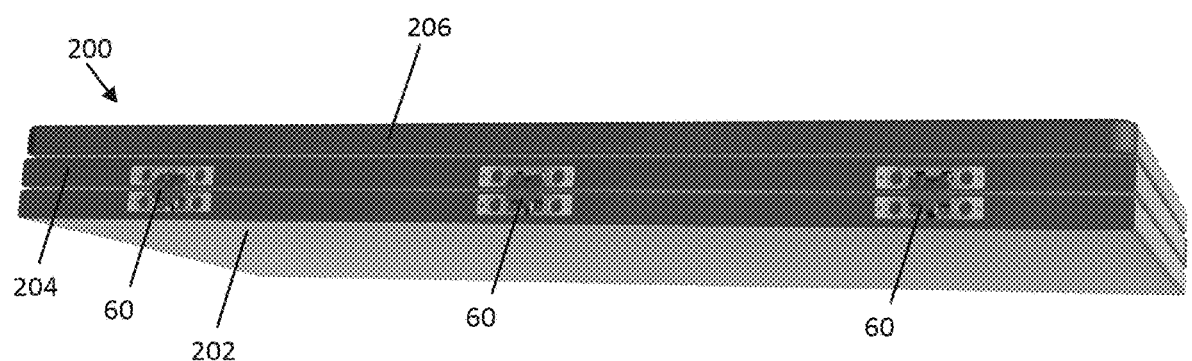

FIGS. 14A and 14B depict a trifold table 200 like the trifold table 20 shown in FIG. 1A. The trifold table 200 has a generally planar central base panel 202, mounted from below on a vertical support post or other supporting structure. The base panel 202 may be movable for translation and rotation around a vertical axis. The base panel 202, in an example implementation, may be maintained near or at horizontal. In some implementations, the base panel 202 may be canted to compensate for flight angle of attack (e.g., two degrees to five degrees). The trifold table 200 has a generally planar first folding panel, referenced as a close folding panel 204 for its close contact with the base panel 202 in the folded condition of the trifold table 200. A generally planar second folding panel is referenced as the spaced folding panel 206 for its vertical offset from the base panel 202 in the folded condition of the trifold table 200 to accommodate the close folding panel 204 therebetween. In the unfolded and flat condition of the trifold table 200, a top side of the base panel 202, a top side of the close folding panel 204, and a top side of the spaced folding panel 206 are generally coplanar to serve together as a tabletop.

The base panel 202 has a first linear end along which the close folding panel 204 is attached by a plurality of first hinges 60 as discussed above. The second linear end of the base panel 202, parallel to the first linear end and spaced therefrom by the length of the base panel, is attached by second hinges 62 to a hinge leaf 208. A first linear end of the spaced folding panel 206 is also attached by the second hinges 62 to the hinge leaf 208. The second hinges 62, constructed different from the first hinges 60, accommodate the vertical offset of the spaced folding panel 206 from the base panel 202 in the folded condition of the trifold table 200, and the hinge leaf 208 generates the vertical offset for the spaced folding panel 206. This permits the close folding panel 204 to be positioned between the base panel 202 and spaced folding panel 206 in the fully folded condition of the trifold table 200 as shown, in which the base panel 202, close folding panel 204, and spaced folding panel 206 are stacked. The same table construction may apply to the table assembly shown in FIG. 1A.

The first hinges 60 by which the close folding panel 204 is attached to the base panel 202 permit the panels to stack or overlap as they are folded together. The first hinges 60 furthermore permit the close folding panel 204 and base panel 202 to align and contact at their attached linear ends in the unfolded planar condition. The first hinges 60 may be biased toward relative positions of the base panel 202 and close folding panel 204 that are intermediate positions between the fully unfolded position and folded position. This slows hinging movement as the limits of their motion range are approached. This also provides lift assistance, thus the perceived weight of the folding panel 204 is reduced as with a counterbalance.

Figure 15A:
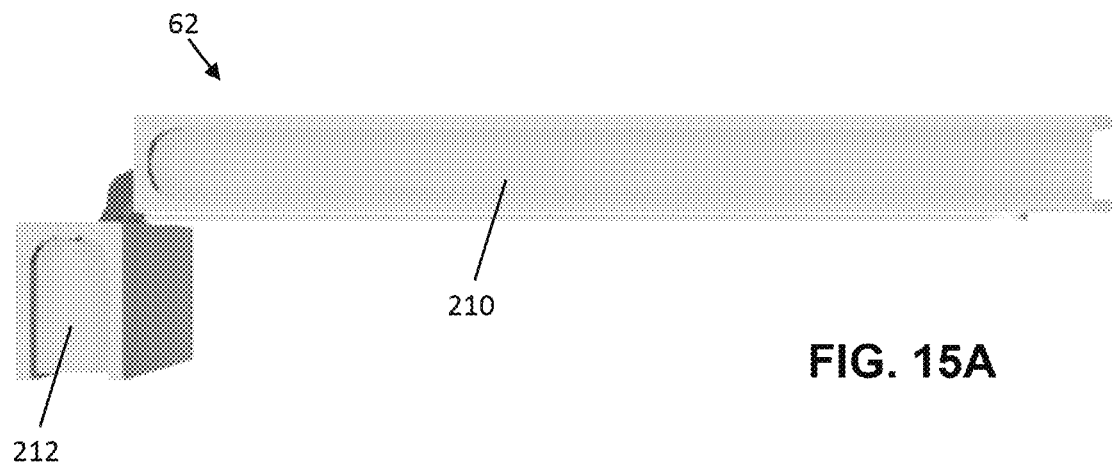
FIGS. 15A and 15B are perspective views of a trifold dampening hinge including first and second coupled assemblies for attachment to a respective folding panel and hinge leaf of the trifold table shown in FIGS. 14A and 14B.
Figure 15B:
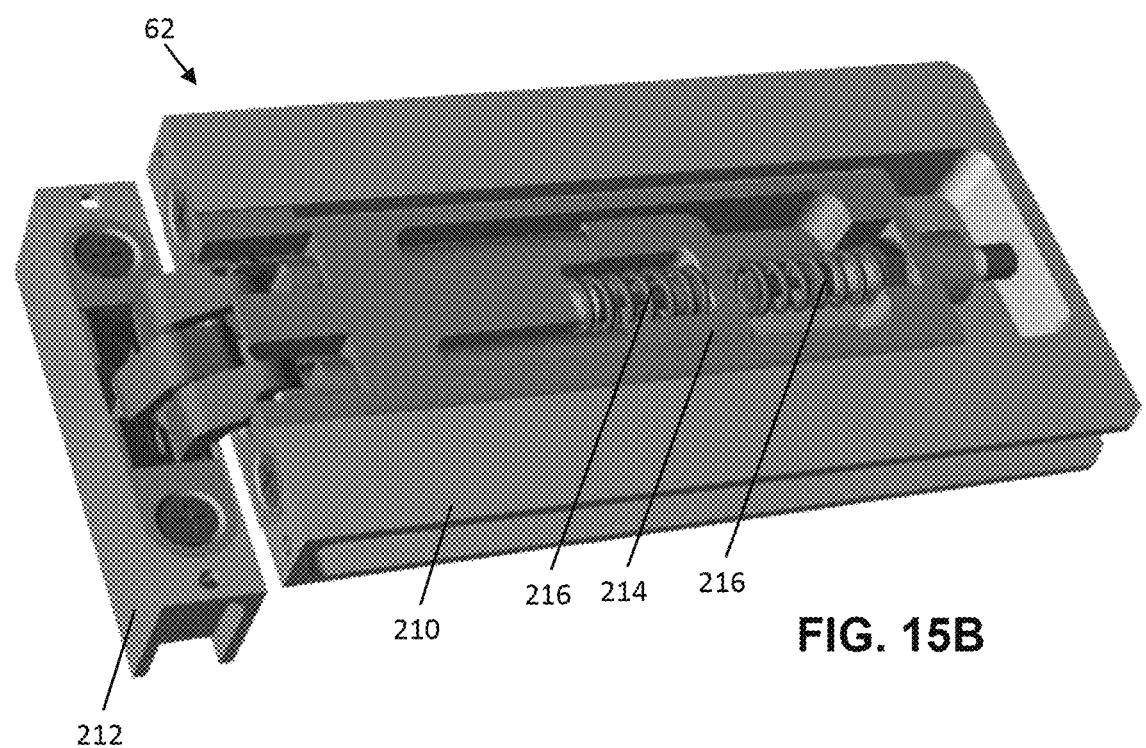

FIGS. 15A and 15B depict the second hinge 62 construction. Each second hinge 62 generally includes a first assembly 210 attachable to its respective panel (e.g., base panel 202 or spaced panel 206), and a second assembly 212 attachable to the hinge leaf 208, wherein the first and second assemblies are pivotally coupled. The second hinges 62 provide similar beneficial functions, including biasing and motion dampening, at the limits of the motion range of the spaced folding panel 206. While the first and second hinges 60, 62 providing similar functionality, whereas in the first hinges 60 or "bifold hinges" the sliders and dampers are located in each of the first and second assemblies (i.e., one slider and one damper in each assembly respectively), in the first assembly 210 of the second hinges 62 or "trifold hinges" one slider 214 and two dampers 216 are housed. The two dampers 216 act on the same slider 214 at different angles. The first and second assemblies 210, 212 are pivotally connected through slide links as discussed above, wherein the links are pivotally connected to their respective housings or assemblies.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A dampened hinge assembly for controlling motion of coupled parts, comprising:
   a first assembly attachable to a first part;
   a second assembly attachable to a second part to be pivotable relative to the first part by the dampened hinge assembly, the second part pivotable relative to the first part between a first condition and a second condition;
   at least one damper for braking pivoting movement of the second assembly relative to the first assembly as the first condition or second condition is approached;
   at least one slider mounted to and movable relative to a housing of the first assembly or the second assembly;
   at least one link pivotally attached to the at least one slider and to a housing of the other of the first assembly or the second assembly and causing movement of the at least one slider upon pivoting movement of the first assembly relative to the second assembly;
   at least one spring disposed between the at least one slider and a distal end of the housing of the first assembly or the housing of the second assembly, the at least one spring for biasing the dampened hinge assembly from the first condition or the second condition; and
   a second spring for biasing the dampened hinge assembly from the other of the first condition or the second condition;
   wherein the at least one slider engages the at least one damper as the first condition or second condition is approached.

2. The dampened hinge assembly according to claim 1, wherein the dampened hinge assembly provides positive stopping when the first condition or the second condition is fully reached.

3. The dampened hinge assembly according to claim 1, wherein the at least one damper brakes pivoting movement of the second assembly relative to the first assembly as the first condition is approached, and wherein the dampened hinge comprises a second damper that brakes pivoting movement of the second assembly relative to the first assembly as the second condition is approached.

4. The dampened hinge assembly of claim 1, wherein the at least one damper comprises a fluid cylinder and a piston.

5. The dampened hinge assembly of claim 1, wherein the first assembly comprises:
   a first housing;
   a first slider mounted to and movable relative to the first housing; and
   a first link pivotally attached to the first housing;
   and wherein the second assembly comprises:
   a second housing;

a second slider mounted to and movable relative to the second housing, and pivotally attached to the first link; and a second link pivotally attached to the second housing and pivotally attached to the first slider.

6. The dampened hinge assembly according to claim 5, wherein, the first assembly comprises the at least one damper, and the at least one damper brakes pivoting movement of the second assembly relative to the first assembly as the second condition is approached by braking linear movement of the first slider relative to the first housing as the second condition is approached.

7. The dampened hinge assembly according to claim 6, wherein, the second assembly comprises a second damper that brakes pivoting movement of the second assembly relative to the first assembly as the first condition is approached by braking linear movement of the second slider relative to the second housing as the first condition is approached.

8. The dampened hinge assembly according to claim 1, wherein:
the first part is a first table portion;
the second part is a second table portion;
the first condition corresponds to a folded condition of the first and second table portions; and
the second conditions corresponds to an unfolded condition of the first and second table portions.

9. A dampened hinge assembly for controlling motion of coupled parts, comprising:
a first assembly comprising a first housing and a first slider mounted within and linearly movable relative to the first housing, the first assembly attachable to a first part;
a second assembly comprising a second housing and a second slider mounted to and linearly movable relative to the second housing, the second assembly attachable to a second part to be pivotable relative to the first part by the dampened hinge assembly, the second part pivotable relative to the first part between a first condition and a second condition;
a first link and a second link, positioned laterally spaced apart, interconnecting the first housing and the second housing and providing multi-axis folding of the dampened hinge assembly;
a first spring disposed between an annular shoulder of the first slider and an end plate of the first housing, the first spring compressible as the second housing is moved into alignment with the first housing and the second link moves the first slider toward the end plate of the first housing; and a second spring disposed between an end plate of the second slider and a distal abutment of the second housing, the second spring compressible as the second housing is moved out of alignment with the first housing and the first link moves the second slider toward a proximal end of the second housing.

10. The dampened hinge assembly according to claim 9, wherein:
the first link has a proximal end pivotally attached to a proximal end of the first housing by a first laterally extending axle fixed to and carried by the proximal end of the first housing, and the first link has a distal end extending outward from the proximal end of the first housing to engage and actuate the second slider; and
the second link has a proximal end pivotally attached to a proximal end of the second housing by a second laterally extending axle fixed at and carried by the proximal end of the second housing, and the second link has a distal end extending outward from the proximal end of the second housing to engage and actuate the first slider.

11. The dampened hinge assembly according to claim 9, wherein the dampened hinge assembly is biased from the first condition by the first spring carried by the first housing, and wherein the dampened hinge assembly is biased from the second condition by the second spring carried by the second housing.

12. The dampened hinge assembly according to claim 9, further comprising:
a first damper carried by the first assembly, the first damper comprising a fluid cylinder within and fixed to the end plate of the first housing and extending outward from the distal end of the first housing, and a piston surrounded by the first spring extending from the fluid cylinder into the first housing toward a head of the first slider; and
a second damper carried by the second assembly, the second damper comprising a fluid cylinder within and fixed to the second housing and a piston surrounded by the second spring and extending outward from the fluid cylinder toward the end plate of the second slider.

13. The dampened hinge assembly according to claim 9, wherein:
the first part is a first table portion;
the second part is a second table portion;
the first condition corresponds to a folded condition of the first and second table portions; and
the second conditions corresponds to an unfolded condition of the first and second table portions.

* * * * *